(12) United States Patent
Lovato

(10) Patent No.: US 8,783,334 B2
(45) Date of Patent: Jul. 22, 2014

(54) HEAT EXCHANGER PARTICULARLY FOR THERMAL GENERATORS

(75) Inventor: Giandomenico Lovato, San Bonifacio (IT)

(73) Assignee: Ferroli S.p.A., San Bonifacio (Verona) (IT)

(*) Notice: Subject to any disclaimer, the term of this patent is extended or adjusted under 35 U.S.C. 154(b) by 1313 days.

(21) Appl. No.: 12/378,117

(22) Filed: Feb. 11, 2009

(65) Prior Publication Data

US 2009/0223655 A1 Sep. 10, 2009

(30) Foreign Application Priority Data

Mar. 10, 2008 (IT) .............................. MI2008A0408

(51) Int. Cl.
*F28D 7/16* (2006.01)
*F28D 7/00* (2006.01)
*F24H 1/20* (2006.01)

(52) U.S. Cl.
CPC ............ *F28D 7/0058* (2013.01); *F28D 7/1684* (2013.01); *F24H 1/205* (2013.01)
USPC ............................. 165/146; 165/158; 165/177

(58) Field of Classification Search
None
See application file for complete search history.

(56) References Cited

U.S. PATENT DOCUMENTS

| | | | | |
|---|---|---|---|---|
| 1,352,802 A | * | 9/1920 | Faust | 122/115 |
| 1,550,402 A | * | 8/1925 | Taylor | 165/146 |
| 2,153,361 A | * | 4/1939 | Franks | 165/114 |
| 2,470,936 A | * | 5/1949 | Lo Gerfo | 62/298 |
| 2,874,683 A | * | 2/1959 | La Rue | 122/18.3 |
| 4,207,944 A | * | 6/1980 | Holtz et al. | 165/82 |
| 4,589,481 A | * | 5/1986 | Mansson | 165/172 |
| 5,181,560 A | * | 1/1993 | Burn | 165/162 |
| 5,339,654 A | * | 8/1994 | Cook et al. | 62/476 |
| 5,573,062 A | * | 11/1996 | Ooba et al. | 165/177 |
| 6,488,079 B2 | * | 12/2002 | Zifferer | 165/133 |
| 7,213,639 B2 | * | 5/2007 | Danielsson et al. | 165/159 |
| 8,162,040 B2 | * | 4/2012 | Briselden | 165/142 |

* cited by examiner

*Primary Examiner* — Allen Flanigan
(74) *Attorney, Agent, or Firm* — Hedman & Costigan, P.C.; James V. Costigan; Kathleen A. Costigan

(57) ABSTRACT

The present invention relates to a heat exchanger for transmitting heat from a gaseous primary fluid to a liquid secondary fluid. In particular, the present invention relates to the thermal exchange means proper, the main feature of which is the use of a diverging tube sheet including a plurality of four-lobe cross-section tubes.

3 Claims, 6 Drawing Sheets

HEAT EXCHANGER PARTICULARLY FOR THERMAL GENERATORS

BACKGROUND OF THE INVENTION

The present invention relates to a heat exchanger, particularly for thermal generators.

Tube sheet heat exchangers, in which one of the fluid is caused to pass in the tubes, usually of a circular cross-section, whereas the other fluid is caused to pass outside of said tubes, in a specifically designed chamber, the so-called "mantle", are already known.

SUMMARY OF THE INVENTION

The aim of the present invention is to provide a high thermal exchange efficiency heat exchanger.

Within the scope of the above aim, a main object of the invention is to provide such a heat exchanger allowing to make very compact boiler bodies.

A further object of the invention is to provide such a heat exchanger allowing to recover the vaporizing latent heat of combustion (condensing) fumes, in the most part of the installing and operating conditions.

Yet another object of the present invention is to provide such a heat exchanger so constructed as to allow to directly build-in in said heat exchanger a burner, while cooling the combustion chamber by the secondary fluid, to greatly reduce the NOx emissions.

Yet another object of the present invention is to provide such a heat exchanger having a small heat exchanger mass, thereby allowing to further reduce the overall thermal inertia, to provide a high response speed to thermal load variations and a great reduction of undesired thermal losses.

Yet another object of the present invention is to provide such a heat exchanger allowing to greatly automatize the making process therefor, and this owing to its specifically designed mechanical construction.

Yet another object of the present invention is to provide such a heat exchanger having a small load loss on the secondary fluid side, with a consequent great reduction of the electrical consume of the fluid driving elements (such as pumps and the like).

Yet another object of the present invention is to provide such a heat exchanger which, owing to its specifically designed constructional features, is very reliable and safe in operation.

According to one aspect of the present invention, the above mentioned aim and objects, as well as yet other objects, which will become more apparent hereinafter, are achieved by a heat exchanger, particular for thermal generators, characterized in that said heat exchanger comprises a plurality of heat exchanger tubes, each of said heat exchanger tubes having a multiple-lobe cross-section.

BRIEF DESCRIPTION OF THE DRAWINGS

Further characteristics and advantages of the present invention will become more apparent hereinafter from the following disclosure of a preferred, though not exclusive, embodiment of the invention, which is illustrated, by way of an indicative, but not limitative, example in the accompanying drawings, where.

DESCRIPTION OF THE PREFERRED EMBODIMENTS

Figure 1:
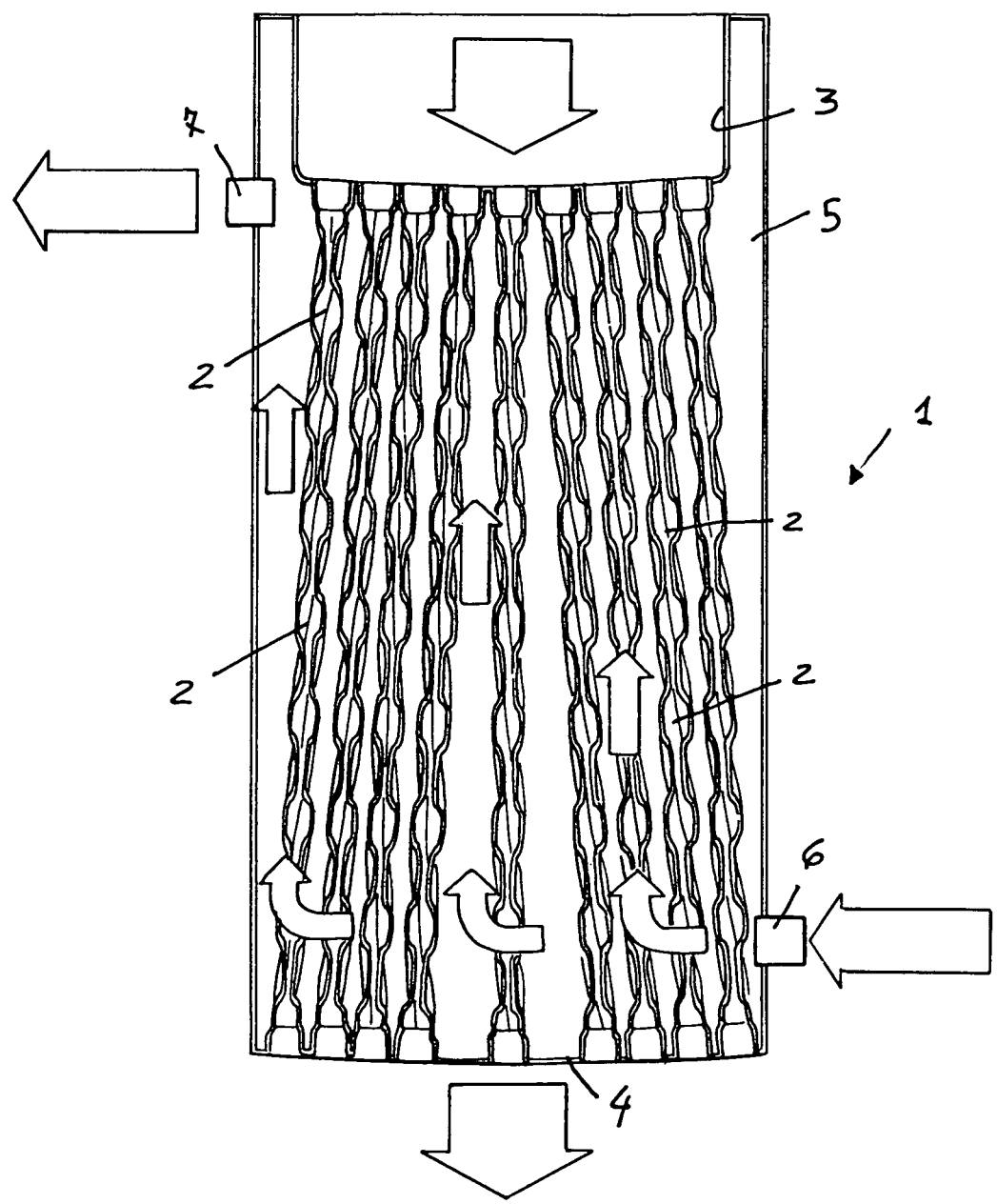
FIG. 1 is a schematic elevation view of the heat exchanger according to the invention.

With reference to the number references of the above mentioned figures, the heat exchanger according to the present invention, which has been generally indicated by the reference number 1, comprises a plurality of heat exchanger tubes having a multiple-lobe cross-section, indicated by the reference number 2, therethrough a primary fluid is caused to pass, and being associated with two perforated elements, that is a top perforated element 3 and a bottom perforated element 4.

Said tubes are associated with said perforated elements, constituted by bottom and/or plate elements, by welding, or a like coupling process and/or by a mechanical type of coupling.

Advantageously, each said heat exchanger tube 2 has a four-lobe or four-leaf cross-section.

Figure 2:
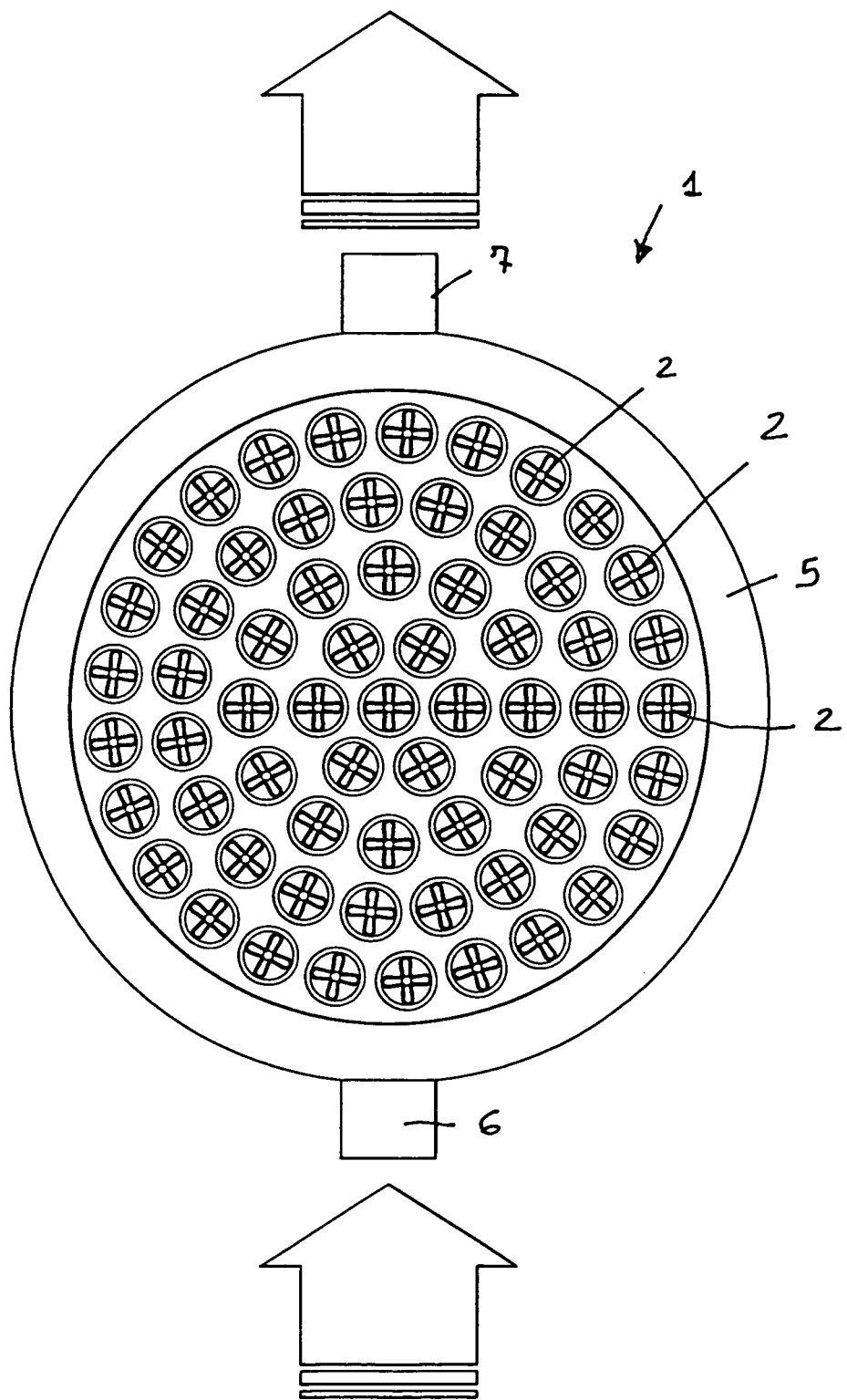
FIG. 2 is a top plan view of the heat exchanger.

The tube sheet construction, in particular, is so made as to arrange the heat exchanger tubes in a spoke-like configuration, with heat exchanger central most tubes of said heat exchanger tubes being diverging from one another at their ends and the rest of said heat exchanger tubes being spaced apart the same distance at either end of the heat exchanger casing or shell 5, in which said tubes are arranged to form a sheet tube, as clearly shown in FIGS. 1 and 2, said casing or shell 5 being preferably though not exclusively made of a metal material, having preferably, though not exclusively, a circular, oval or elliptic bottom, thereby it forms a single body and being provided with two or more openings, indicated by the reference numbers 6 and 7, respectively for an inlet and an outlet of a secondary fluid.

More specifically, said secondary fluid is caused to flow in said shell 5 and circulate through said inlets/outlets or outputs 6 and 7 preferably, though not exclusively, by outer mechanical means, thereby said secondary fluid is adapted to contact, from the bottom to the top, at a suitably designed flow rate, the outer part of the tube sheet, inside of which the primary fluid is caused to circulate.

The comparatively large passage cross-section provided for the secondary fluid allows to achieve a low raising rate or speed of said secondary fluid, with an optimal thermal exchange on all the tubes 2 forming the inventive heat exchanger.

As stated, said heat exchanger tubes 2 have a four-lobe or four-leaf cross-section, including four-lobes 21, either of a symmetrical or of an asymmetrical configuration, arranged as a crown about a central hollow body 22, and having preferably, though not exclusive, a circular cross-section.

Figure 3:
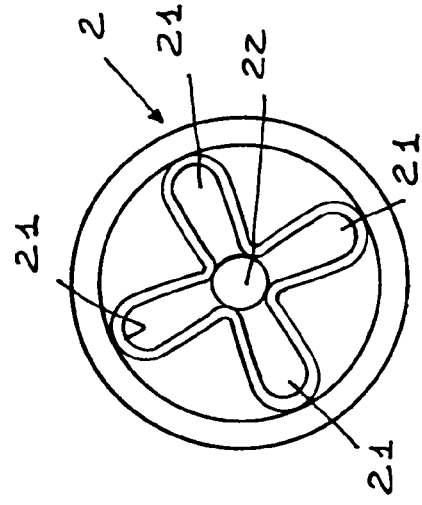
FIG. 3 is a cross-sectional view of a four-lobe tube of the heat exchanger according to the present invention.

FIG. 3 shows, in an exemplary and not limitative manner, a possible embodiment of the above mentioned cross-section, while, however, may have any desired conceptually similar pattern or configuration, but with different lobe patterns and size and with a different central body, depending on the thermal exchanger application and on the fluid thermal exchange requirements.

In particular, the heat exchanger tubes 2 constituting the inventive heat exchanger, are made by a simultaneous translation and rotation of the above mentioned four-lobe cross-section on its main axis.

Figure 4:
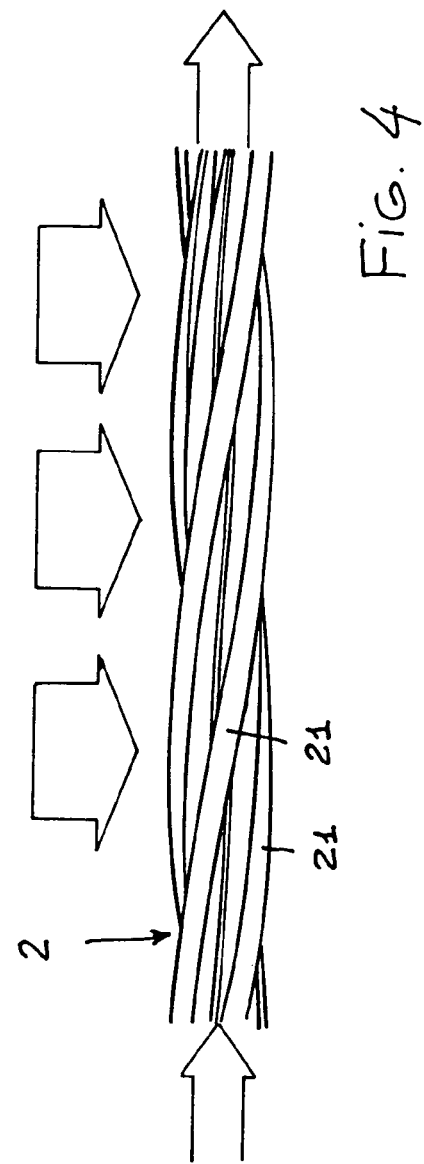
FIG. 4 is a side view illustrating the outer configuration or geometry of the four-lobe tubes of the inventive heat exchanger.

The thus obtained tube geometry or configuration, shown in FIG. 4, can be considered as a four-lobe base coil, rectilinearly extending through the space.

Thus, the specifically designed four-lobe configuration, and its coil pattern as above disclosed, allows to achieve a large turbulence of the gaseous primary fluid circulating in the heat exchanger tubes as well as a high contact surface with the secondary fluid for unit length.

The result of this novel tube configuration is that of facilitating a high and efficient heat transmission from one fluid to the other.

Figure 5:
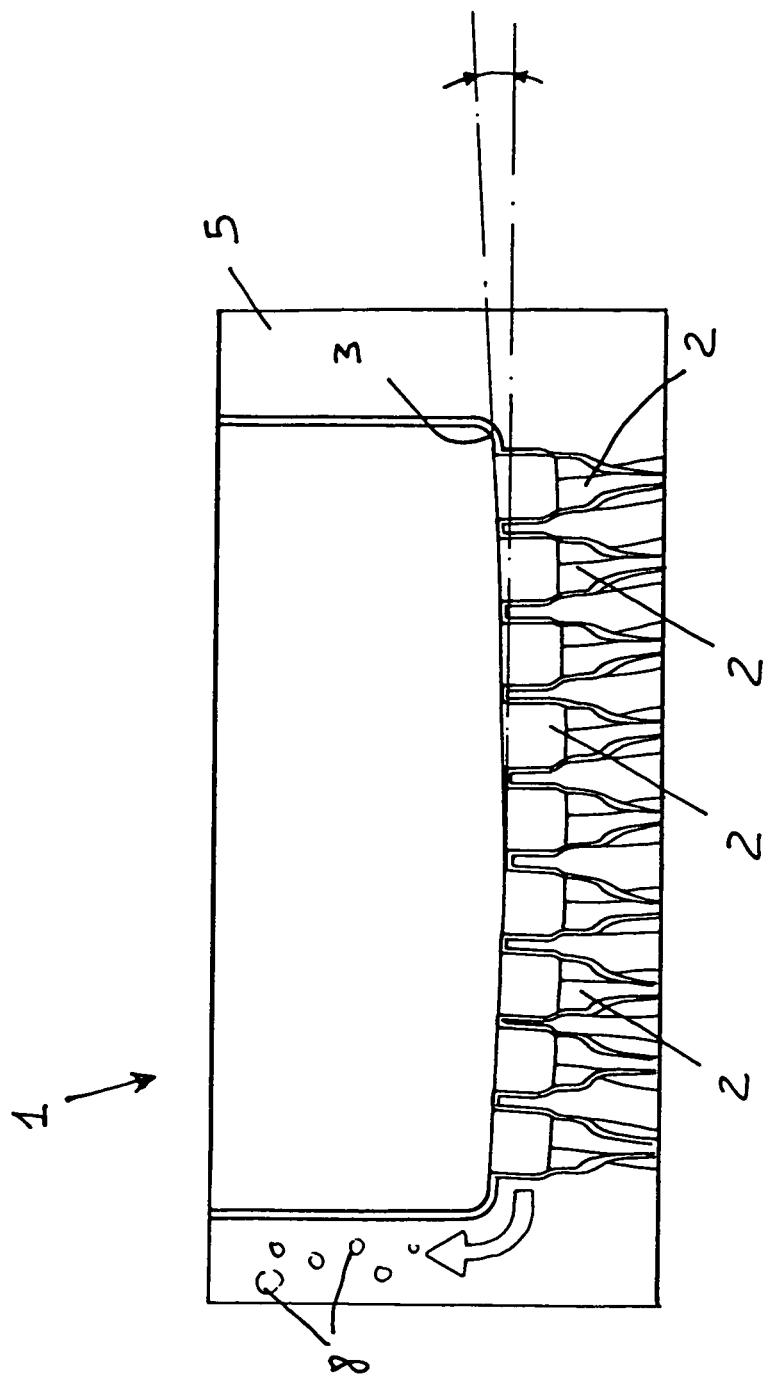
FIG. 5 is a partially cross-sectioned elevation view of the top region of the heat exchanger, showing a deaeration of the secondary fluid.

The tube sheet construction is so made, moreover, that the heat exchanger tubes 2 are preferably, though not exclusively, diverging from one another, thereby allowing to provide, in a very construction-wise simple manner, the plate or top bottom 3 of the heat exchanger with a slight upward directed convexity, as is shown in FIG. 5.

This allows to favor an efficient and full deaeration of the liquid secondary fluid held in the heat exchanger, while preventing air bubbles or pockets from forming in the heat exchanger, susceptible to negatively affect the thermal exchange operation.

FIG. 5 schematically shows air bubbles 8 which are laterally ejected owing to the convexity of the bottom 3.

Moreover, it should be pointed that the specifically designed pattern of the inventive heat exchanger allows to directly build-in in the top of the heat exchanger body one or more premixed, blown, catalytic burners for gaseous, solid and liquid fuels.

Thus, the top portion of the heat exchanger operates as a combustion chamber with combustion chamber walls which are directly cooled by the secondary fluid.

Figure 6:
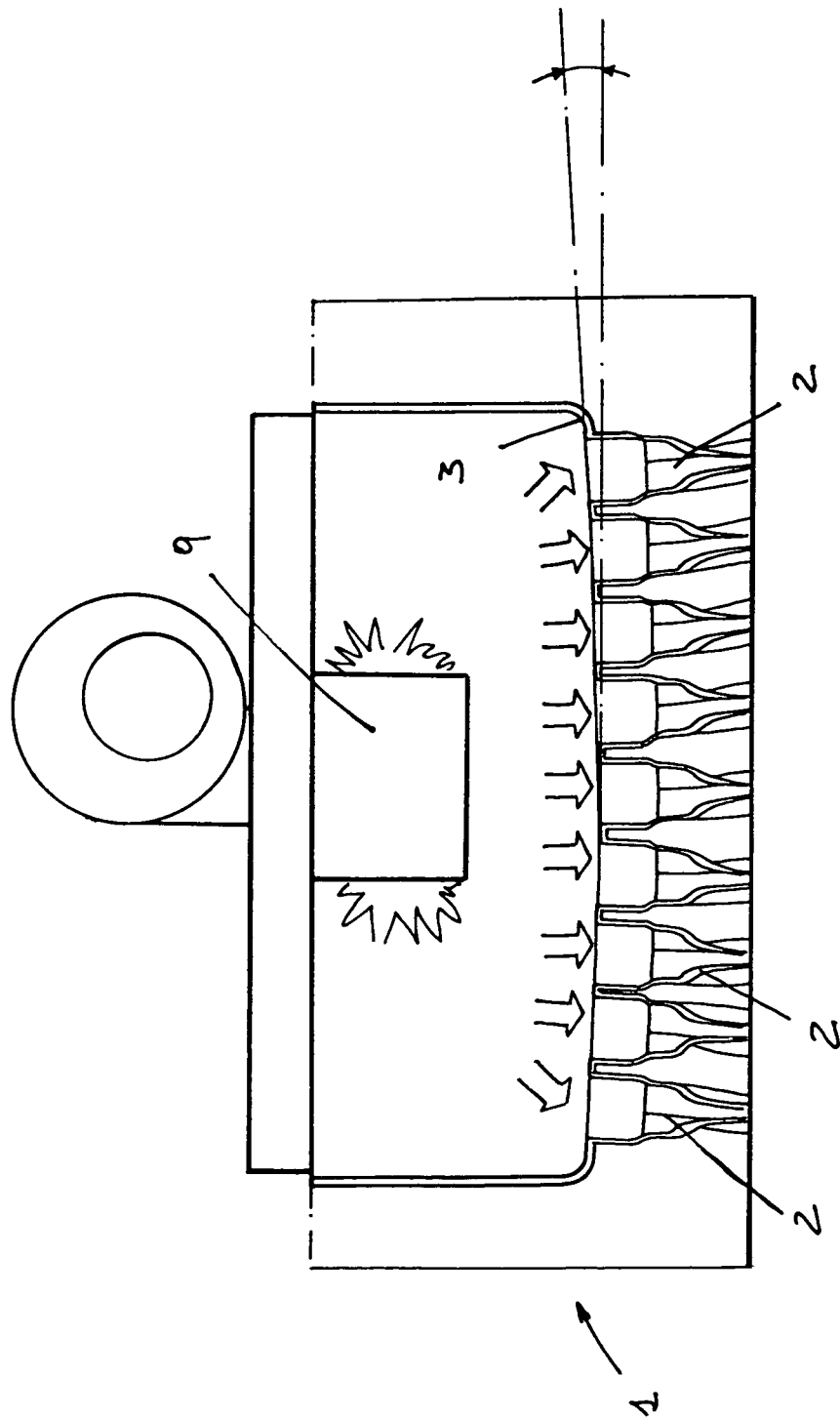
FIG. 6 is a view similar to FIG. 5, showing a burner being housed on a top part of the inventive heat exchanger.

FIG. 6 schematically shows the arrangement of the burner, generally indicated by the reference number 9.

Thus, the direct cooling of the combustion chamber walls can efficiently hinder a generation of thermal NOx, during the combustion process, thereby allowing to advantageously reduce the emission of polluting materials from the heat generator.

Figure 7:
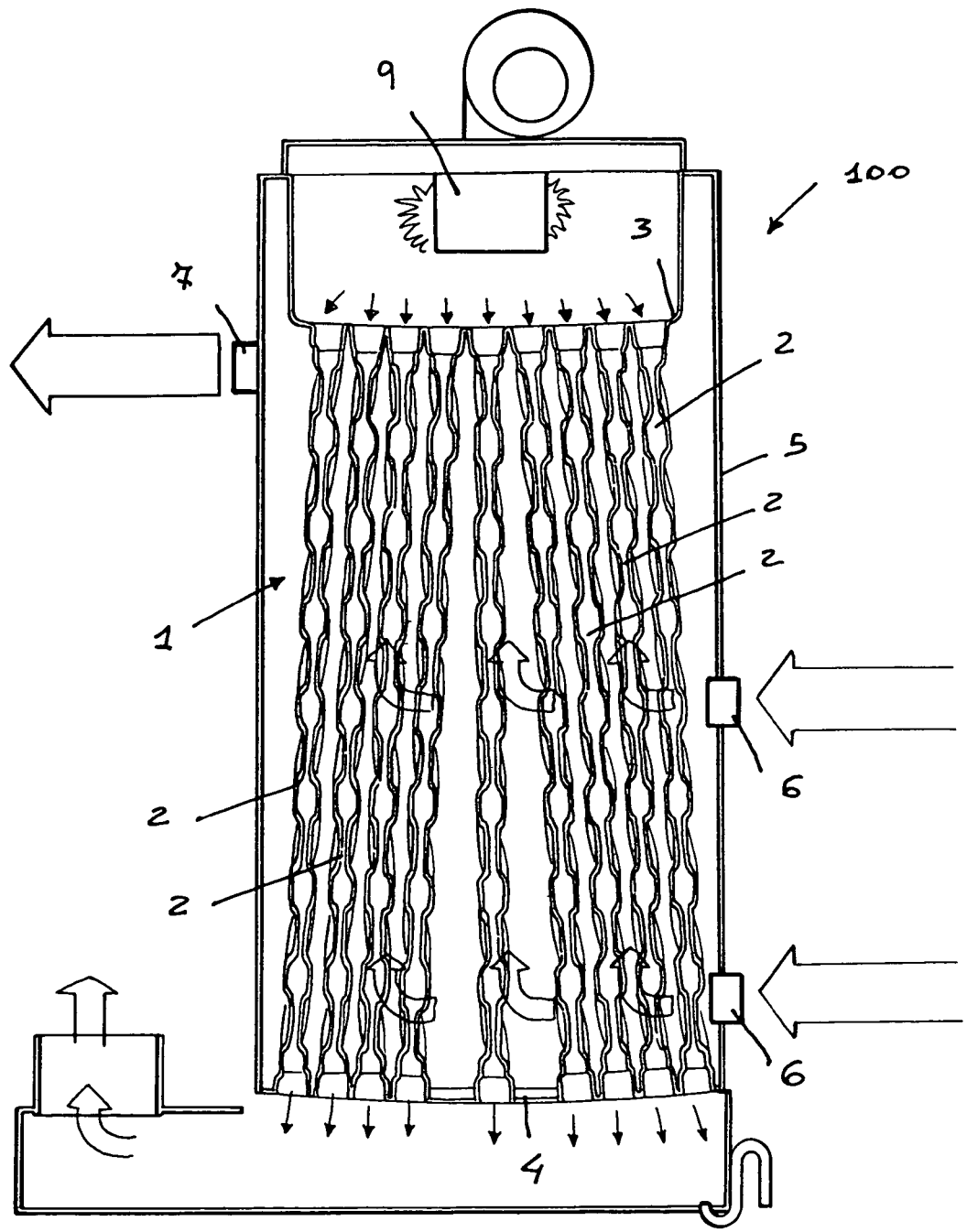
FIG. 7 is an elevation view schematically showing the operation of a heat generator including a heat exchanger according to the present invention.

FIG. 7 schematically shows a heat exchanger, generally indicated by the reference number 100, including the heat exchanger according to the present invention.

The overall construction of the heat exchanger 1, coupled to a burner either of a premixed, blown or catalytic type 9, allows to make a condensation heat generator 100 which can be operated with very high temperature differences in the secondary fluid and/or different secondary fluid inlet temperatures.

Such a mode of operation, in addition to providing a very great advantage with respect to a system use flexibility, allows to easily recover fume vaporization latent heat (combustion fume condensation), with a consequent very high thermal yield efficiency, in the most part of the installing and operating condition.

The above disclosed heat exchanger can be constructed starting from different construction materials, depending on its application but, preferably, though not exclusively, being made of stainless steel, other steel materials, copper, aluminium, plastic materials and so on.

In particular, the inventive heat exchanger has been specifically, though not exclusively, be used in thermal generators for heating and/or generating sanitary use hot water.

Moreover, the possibility of achieving an efficient thermal exchange between a gaseous fluid and a liquid fluid, while providing a high turbulence of the first fluid, a large contact surface with the secondary fluid, and an efficient thermal exchange and a very good deaeration of the secondary fluid and the possibility of directly mounting at the top of the heat exchanger body a burner, makes the inventive heat exchanger specifically suitable to be used in boilers, preferably, though not exclusively, designed for providing hot water for heating purposes, as well as for hygienic-sanitary uses.

Furthermore, the features of this heat exchanger allow it to be used in heat generators including either premixed, blown, or catalytic burners, operating on gaseous, solid and liquid fuels.

Moreover, the possibility of using different materials for making the inventive heat exchanger, makes the latter suitable for use in different types of heat generators, such as conventional generators, condensation generators, and so on.

It has been found that the invention fully achieves the intended aim and objects.

In fact, the invention has provided a heat exchanger the constructional features of which provide a lot of advantages.

In particular, the inventive heat exchanger has a very high thermal exchange efficiency, owing to the high turbulence of the gaseous fluid due to the fourth-lobe cross-section tubes and a very large fluid contact surface.

Moreover, the heat exchanger according to the present invention allows to use boiler bodies of a very compact size, also due to the large surface for length unit of the tube sheet.

Moreover, the heat exchanger according to the present invention allows to handle a secondary fluid very great volume, with a consequent low speed of said fluid through said exchanger and a very good thermal exchange of all the tubes forming the heat exchanger.

Moreover, the inventive heat exchanger is adapted to operate with high temperature differences of the secondary fluid and/or different secondary fluid inlet temperatures.

Yet another advantage is the possibility of recovering the vaporization latent heat of the combustion (condensation) fumes in the most part of the installing and operating conditions.

Yet another advantage of the inventive heat exchanger is the possibility of directly associating with the heat exchanger a burner, while cooling the combustion chamber by the secondary fluid and greatly reducing the NOx emissions.

Furthermore, the inventive heat exchanger has a reduced mass, allowing to consequently reduce the overall thermal inertia, while assuring a high response speed to thermal load variations and a great reduction of undesired thermal losses.

Yet another advantage of the inventive heat exchanger is the possibility of highly automatizing its making process, owing to the particular mechanical construction of the heat exchanger.

Furthermore, the inventive heat exchanger has a very small load loss on the secondary fluid side, with a consequent great reduction of the electrical consume of the fluid driving elements (such as pumps and the like).

In practicing the invention, the used materials, as well as the contingent size and shapes, can be any, depending on requirements.

The invention claimed is:

1. A heat exchanger for thermal generators, said heat exchanger comprising a plurality of heat exchanger tubes, arranged in a spoke-like configuration, wherein each said exchanger tube has a four-lobe cross-section, wherein central-most heat exchanger tubes of said heat exchanger tubes are diverging from one another at their ends and a rest of said heat exchanger tubes are spaced apart a same distance at either end of a heat exchanger metal shell, wherein said four-lobe cross-sections are arranged, either with a symmetrical or an asymmetrical pattern, on a crown about a central hollow body having a circular cross-section, and wherein each said exchanger tube has a tube construction defined by a simultaneous translation and rotation of said four-lobe cross-section on a main axis of said heat exchanger.

2. A heat exchanger, according to claim 1, wherein said diverging tubes, therethrough a primary fluid is caused to pass, are welded to two perforated plate elements, a top perforated plate element and a bottom perforated plate element, and wherein said top and bottom perforated elements comprise an upward convexity.

3. A heat exchanger, according to claim 1, wherein said diverging tubes are attached to a discrete tube sheet arranged inside said metal shell, said metal shell having a circular, oval or elliptic base cylindric configuration, including two or more secondary fluid inlet and outlet openings, and forming a single body with said head exchanger.

* * * * *